United States Patent [19]

Ooten

[11] Patent Number: 5,775,025
[45] Date of Patent: Jul. 7, 1998

[54] LIMITED RESISTANCE DIVE-ACTION BAIT-NAVIGATING FISHING BOBBER

[76] Inventor: Dorothy Marie Ooten, 2271 Bethel Hygiene Rd., Bethel, Ohio 45106

[21] Appl. No.: 788,393

[22] Filed: Jan. 27, 1997

[51] Int. Cl.$^6$ ................................................ A01K 93/00
[52] U.S. Cl. ........................... 43/43.1; 43/44.87; 43/44.9
[58] Field of Search .................... 43/17, 43.14, 44.87, 43/44.92, 44.93, 44.94, 44.95, 43.1, 43.13, 44.9

[56] References Cited

U.S. PATENT DOCUMENTS

| | | | |
|---|---|---|---|
| 3,401,483 | 9/1968 | Bellah | 43/43.1 |
| 3,818,624 | 6/1974 | Duffy | 43/43.13 |
| 3,977,115 | 8/1976 | Check | 43/43.11 |
| 4,748,764 | 6/1988 | Hammons | 43/44.87 |
| 5,161,324 | 11/1992 | Dorsey | 43/43.1 |
| 5,243,780 | 9/1993 | Christiensen | 43/44.87 |
| 5,373,659 | 12/1994 | Neese, Jr. | 43/44.94 |
| 5,595,016 | 1/1997 | Feher | 43/44.87 |

*Primary Examiner*—Jack W. Lavinder

[57] ABSTRACT

A Limited Resistance dive-action bait-navigating bobber for use on a fishing line, comprising a flat floatant material of an inverted tear-drop design with a small hole for attaching to a fisherman's fishing line, a weight of a proportionate size attached to the bottom of floatant material of an inverted tear-drop design to allow the flat floatant material of an inverted tear-drop design to float in a stable upright position in a body of water and dive and navigate a baited fisherman's fishing line to different depths in the water by the directional movement of the fishing line to the fisherman in an effort to catch fish.

1 Claim, 1 Drawing Sheet

5,775,025

1

LIMITED RESISTANCE DIVE-ACTION BAIT-NAVIGATING FISHING BOBBER

This invention relates to fishing bobbers, sometimes referred to as floats, especially to such fishing bobbers of an inverted tear-drop design affording substantially limited resistance to the force of the water when diving designed to dive and enable a fisherman to navigate an attached fishing line with a baited hook in a body of water for the purpose of catching fish.

BACKGROUND-DESCRIPTION OF PRIOR ART

Originally fishing bobbers were designed to float at the surface of a body of water with a fisherman's fishing line attached to the bobber and a baited hook would float in the water just below the bobber. The visible movement of the bobber when the fish strikes the attached baited hook alerts the fisherman to the presence of the fish. Over the years many different shapes and styles of bobbers have come along to serve the different needs of the fisherman in the quest to catch fish. Many bobbers have been designed to perform a variety of functions.

The adjustable line float as referred to in U.S. Pat. No. 3,977,115 to Check in 1976 is one example. This float allowed for movement on the fishing line in order to fish the bait below the float at different levels in the water. U.S. Pat. No. 5,243,780 to Christensen in 1993 refers to detachable vanes and retention systems that allow for switching between slip modes and stationary modes.

Slip floats are weighted so as to give motion to bait by sinking at different rates of speed in the water.

Chum bobs are designed to carry fish- attracting substances in them to attract fish. Floats and bobbers have been designed to fill with water and float at different levels in the water or even be used as sinkers. There are round floats and bobbers, tubular floats, pencil-thin floats and extra sensitive floats to aid the fisherman in catching fish.

U.S. Pat. No. 4,748,761 to Machovina in 1987 refers to a float designed with lighting for night fishing. Many different types of bobbers or floats have been offered by the fishing industry to serve different purposes. Different rigs can be used for different results, but many are difficult to use and many serve just one simple function. To my knowledge and through my searching I have not found any bobbers or floats designed specifically to dive and navigate a baited fisherman's fishing line in the manner described herein. I am aware of no prior art of this design.

OBJECTS AND ADVANTAGES

The advantages of the dive-action bait-navigating fishing bobber are the sensitivity of the bobber and the simplicity and diversity of action it has within the scope of a single cast and return of the fisherman's line into a body of water. The ability to navigate live, fresh or artificial bait on the fisherman's line from a surface floating position into a dive action, covering depths from top to bottom, returning to the surface or searching the bottom in a single cast and return by the fisherman, offers great advantages in seeking out fish. The diving action of the bobber gives a lure-like action to the attached bait. The bobber itself becomes a lure to fish through the diving and navigating motion. The bobber is extremely sensitive to the fish strike because of the flatness of the bobbers inverted tear-drop design, therefore when the fish pulls at the bait the bobber gives little resistance to the tug of the fish,thus the fish is less likely to let go of the bait. In muddy water conditions the mobility of a brightly colored bobber can be a great advantage in attracting fish. When the art of using the dive-action bait-navigating bobber is learned the maneuverability of the action is extremely valuable to the fisherman in seeking out fish.

The object of the present invention is to provide a new more sensitive diving bobber that is less resistant of the force of the water when diving, either from the return action of the fishing line to the fisherman or from the directional pull of a fish striking the baited fishing line.

The dive-action bait-navigating bobber gives the fisherman the choice of floating the surface or to dive and navigate the bobber with the bait to any level desired at any chosen rate of speed by the return action of the fishing line to the fisherman. The fisherman may choose to bob the bobber with the attached bait along the edge of brush or dive the attached baited line to the bottom and search the bottom. The dive-action bait- navigating bobber can be a valuable aid in catching fish.

SUMMARY OF THE INVENTION

The dive-action bait-navigating bobber is a fishing bobber made from a flat floatant material cut or formed into an inverted tear-drop design of a predetermined size and proportionately weighted so as to float visibly in a body of water.

The bobber is designed to attach to a fisherman's fishing line and be positioned at a desired distance from a baited hook for the purpose of aiding in the catching of fish. The shape of the dive-action bait-navigating bobber comprises means for diving and navigating a fisherman's baited fishing line through the returning action of the fishing line to the fisherman thus, enabling the fisherman to take the bait to different depths in a body of water for purposes of attracting fish.

The further object of the present invention is to be able to seek fish out more effectively by floating and visibly watching for a strike or, if there is no response to the baited line at the surface floating position, the fisherman has the option to dive and navigate a baited line to different levels in a body of water from top to bottom at the fisherman's discretion. The dive-action bait-navigating bobber can be bobbed on the surface or bounced on the bottom and anywhere in the middle. A variety of actions can be mastered by the fisherman with this bobber.

The flat inverted tear-drop designed bobber, weighted beneath the line attachment of the fishermans line allows the bobber to float in a stable vertical upright position in the body of water, further allowing the bobber to be pulled into a diving action at an angle down into the body of water, by the force of the water against the flat planing surface of the face of the bobber when pulled directionally by the fisherman in the return action or by the fish striking at the bait on the fishing line. The flatness of the inverted tear-drop design further allows limited resistance to the force of the water due to the weighted pointed tip of the bobber and flatness of the inverted tear-drop design leeding the bobber down through the water, much like an arrow, the narrow tip piercing the substance of the water first allowing the rest of the flat inverted tear-drop bobber to follow with limited resistance making the bobber substantially less resistant to the force of the water when diving and substantially less resistant to the strike of the fish, thus resulting in the loss of fewer fish.

The flat inverted tear-drop designed bobber, weighted beneath the line attachment of the fishermans line allows the bobber to float in a stable vertical upright position in the body of water, further allowing the bobber to be pulled into a diving action at an angle down into the body of water, by the force of the water against the flat planing surface of the face of the bobber when pulled directionally by the fisherman in the return action or by the fish striking at the bait on the fishing line. The flatness of the inverted tear-drop design further allows limited resistance to the force of the water due to the weighted pointed tip of the bobber and flatness of the inverted tear-drop design leeding the bobber down through the water, much like an arrow, the narrow tip piercing the substance of the water first, allowing the rest of the flat inverted tear-drop bobber to follow with limited resistance making the bobber substantially less resistant to the force of the water when diving and substantially less resistant to the strike of the fish, thus resulting in the loss of fewer fish.

DRAWING FIGURES

REFERENCE NUMERALS IN DRAWINGS

Figure 1:
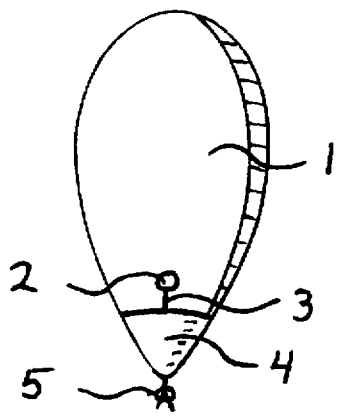
FIG. 1 Illustrates the assembled bobber of the chosen example. This view also depicts the inverted tear-drop design of the bobber.

1 Flat inverted tear-drop shaped floatant material
2 Small hole in floatant material
3 Short piece of fishing line
4 Weight
5 Knot
6 Top of hole passing through center of weight
7 Bottom of hole passing through center of weight
8 Hollowed-out portion of weight
9 Water line
10 Fisherman's fishing line
11 Arrow showing directional movement of line toward fisherman
12 Arrow showing direction of water pushing against the flat surface of bobber
13 Arrow showing the downward diving direction of the bobber

DETAILED DESCRIPTION

Referring now in detail to the drawings, the bobber essentially comprises, for this example, a flat floatant material die-cut to an inverted tear-drop design as shown in REF. NUMERAL 1 of FIG 1 AND FIG. 3. The floatant material used for this example being a flat floatant material made of cross-linked polyethylene foam, 1/40 inch thick, 2¼ inches at the longest vertical points, and 1 inch horizontally at the widest points, of a predetermined color, preferably bright colors for attracting fish. Different sizes may be used when proportionately balanced with the attached weight. Various manufacturers of foam products can be located throughout the U.S., such as American Excelsior Co. in Cincinnati, Ohio. Any suitable floatant material to achieve the design may be substituted, such as wood, rubber or plastic.

Figure 2:
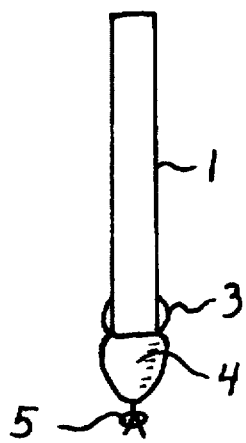
FIG. 2 Illustrates the side view, both sides being identical, and depicts the flatness of the front and back of the floatant material.

The side view of FIG. 2 depicts the flatness of the floatant material, forming the flat face of the bobber, allowing for a more sensitive and less resistant bobber when diving or being pulled by the fish. Both sides, left and right are identical. A small hole is punched through the floatant material, with a sharp pointed tool, at the bottom of the floatant material in the bobber as shown in REF. NUMERAL 2 of FIG. 1 and FIG. 3. The hole is punched approximately ⅝ inch from the bottom tip of the floatant material.

A 4- to 6-inch piece of nylon fishing line is cut from a roll of nylon fishing line to use as attaching means, for this example, of the floatant material to the weight as shown in REF. NUMERAL 3 of FIG. 1 and FIG. 3.

Figure 3:
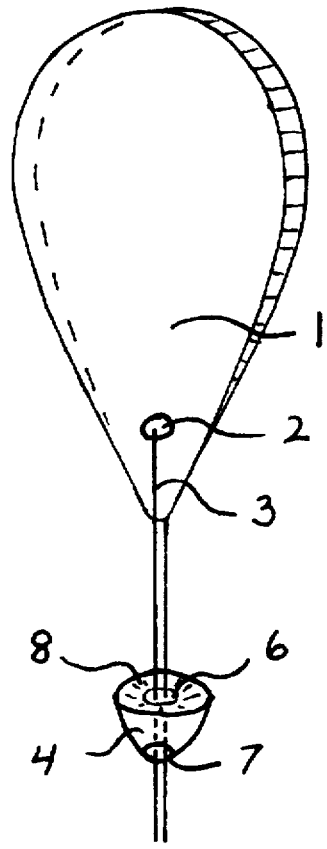
FIG. 3 Illustrates an exploded perspective view of the assembly of the bobber's floatant material and means for attaching to the chosen bullet- style weight.
Figure 4:
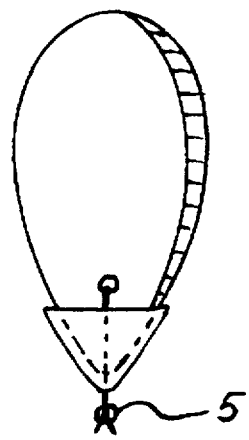
FIG. 4 Illustrates a perspective view of the floatant fitted into and attached to the bullet weight.

A weight of a proportionate size for the size bobber used is chosen. Weights can be found at most fishing supply stores. They can be made of lead, steel, brass, tin or any other suitable material for weight. A ⅛ oz. bullet-style weight made of lead is use for this example as shown in REF. NUMERAL 4 of FIG. 1 and FIG. 3. The bullet-style weight is partially hollowed out as seen in REF. NUMERAL 8 of FIG. 3. The piece of fishing line REF. NUMERAL 3 of FIG. 3 is threaded through the small hole REF. NUMERAL 2 of FIG. 3 in the floatant material and both ends pulled down to thread through the top of the hole in the center of the weight, depicted in REF. NUMERALS 6 of FIG. 3, out the bottom hole in the center of the weight, as seen in REF. NUMERAL 7 of FIG. 3. The weight is then pulled up toward the bottom or tip of the floatant material on the piece of fishing line to fit snuggly on the bobber. The floatant material is actually pulled down into the partially hollowed-out area of the weight as seen in REF. NUMERAL 8 of FIG. 3. FIG. 4 shows the weight pulled up to the bobber where a knot is then tied, REF. NUMERAL 5 of FIG. 4, at the bottom of the weight so as not to allow the weight to slip off the floatant material.

Figure 5:
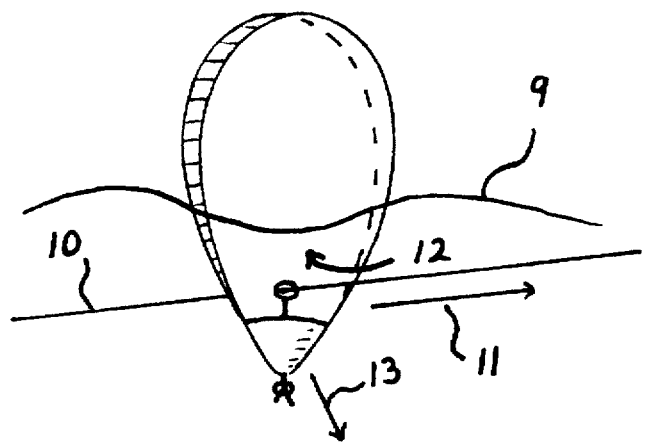
FIG. 5 Illustrates the bobber floating at the surface water line. This view also shows how the directional movement of the bobber on the fisherman's fishing line pushes the flat surface of the bobber against the water, thus the water pressure against the face of the bobber forces the bobber down into a diving action in the body of water.

The completed bobber is now ready to attach to the fisherman's fishing line as shown in FIG. 5 REF. NUMERAL 10. The fisherman's fishing line is threaded through the small hole in the floatant material, REF. NUMERAL 2 of FIG. 1 and FIG. 3; the same hole used to attach the weight to the floatant material is used to attach the fisherman's line. The line is pulled from the tip of the fisherman's rod through the small hole in the bobber and a baited hook is placed at the end of the fishing line at a predetermined distance from the bobber. The bobber can be locked into a desired position on the fishing line by line locking means chosen by the fisherman.

Different methods of locking the bobber into position can be chosen, such as threading the line between the floatant material and the piece of fishing line used to secure the weight to the bobber, a bobber stop may be used, or the bobber may be left free to slide on the line. This is done at the discretion of the fisherman. When the bobber is positioned at the desired position from the bait, the line is now ready to cast into a body of water to seek out fish.

The fisherman casts the baited fishing line with the bobber into the water to the desired distance. The proportionately balanced bobber should float vertically upright and visible to the fisherman just above the water line as shown by REF. NUMERAL 9 of FIG. 5. The fisherman may choose to wait for a strike at the bait by a fish or the fisherman may choose to dive and navigate the bobber with the attached bait by pulling or retrieving the line through the directional movement toward the fisherman, said directional movement shown by REF.NUMERAL 11 of FIG.5, the arrow pointing toward the fisherman. This retrieval or directional movement toward the fisherman pulls the bobber against the water, allowing the pressure of the water against the flat face of the weighted bobber, as shown in REF. NUMERAL 12 of FIG. 5, to pull the bobber down into a diving action, REF. NUMERAL 13 FIG. 5 the arrow shows the downward diving direction. The inverted tear drop design of the bobber allows it to dive in the retrieval process. The more constant the returning of the fishing line to the fisherman the deeper the bobber will dive with the attached bait, thus enabling the fisherman to float the top or dive and fish the baited line at any desired depth with a variety of action to the bobber and the attached bait in an effort to attract and catch fish. When the returning action stops, the bobber will return to a floating position in the water at the point where the returning action stops.

Different size bait may be chosen to fish with this bobber according to the size bobber chosen. Live, artificial or fresh bait may be used at the discretion of the fisherman. The size of the bobber may also effect the distance of the cast.

I claim:

1. A fishing bobber comprising a tear drop shaped planar floatant material having a wide top portion, a narrow, pointed bottom portion, a front flat side, a back flat side and a small hole, adjacent the bottom portion, extending through the material from the front side to the back side;

a conical shaped weight having a hole extending from the base of the cone along the centerline of the cone to and through the tip of the cone wherein the conical shaped weight hole receives the pointed end of the planar floatant material to help retain the planar floatant material to the weight; and, an attachment means for attaching the conical shaped weight to the pointed bottom portion of the tear drop shaped planar floatant material, the attachment means comprises a short piece of fishing line that extends through the holes in the planar floatant material and the conical shaped weight wherein a knot is used to tie the ends of the short piece of fishing line together after it has been passed through the holes to retain the weight against the pointed end of the planar floatant material.

* * * * *